(12) United States Patent
Mandel et al.

(10) Patent No.: US 10,207,452 B2
(45) Date of Patent: Feb. 19, 2019

(54) PRINTER HAVING SEPARATED PRINTHEAD ARRAY AND METHOD FOR OPERATING A PRINTER HAVING A SEPARATED PRINTHEAD ARRAY

(71) Applicant: Xerox Corporation, Norwalk, CT (US)

(72) Inventors: Barry P. Mandel, Fairport, NY (US); James L. Giacobbi, Penfield, NY (US); Paul J. McConville, Webster, NY (US); David A. Mantell, Rochester, NY (US); James J. Spence, Honeoye Falls, NY (US); James P. Calamita, Spencerport, NY (US)

(73) Assignee: Xerox Corporation, Norwalk, CT (US)

(*) Notice: Subject to any disclaimer, the term of this patent is extended or adjusted under 35 U.S.C. 154(b) by 304 days.

(21) Appl. No.: 15/195,475

(22) Filed: Jun. 28, 2016

(65) Prior Publication Data

US 2017/0368741 A1  Dec. 28, 2017

(51) Int. Cl.
| | |
|---|---|
| *B29C 64/112* | (2017.01) |
| *B41J 2/145* | (2006.01) |
| *B33Y 10/00* | (2015.01) |
| *B33Y 30/00* | (2015.01) |
| *B33Y 50/02* | (2015.01) |
| *B29C 64/386* | (2017.01) |
| *B29C 64/20* | (2017.01) |
| *B41J 2/51* | (2006.01) |
| *B29C 64/209* | (2017.01) |

(52) U.S. Cl.
CPC ............ *B29C 64/112* (2017.08); *B29C 64/20* (2017.08); *B29C 64/209* (2017.08); *B29C 64/386* (2017.08); *B33Y 10/00* (2014.12); *B33Y 30/00* (2014.12); *B33Y 50/02* (2014.12); *B41J 2/145* (2013.01); *B41J 2/51* (2013.01)

(58) Field of Classification Search
CPC ..... B29C 64/112; B29C 64/386; B29C 64/20; B33Y 10/00; B33Y 30/11; B33Y 50/02; B41J 2/145
USPC ......................................................... 264/494
See application file for complete search history.

(56) References Cited

U.S. PATENT DOCUMENTS

| | | | |
|---|---|---|---|
| 2002/0071000 A1 | 6/2002 | Rezanka | |
| 2004/0075196 A1* | 4/2004 | Leyden | B29C 41/12 264/401 |
| 2004/0141042 A1* | 7/2004 | Silverbrook | B22F 3/008 347/102 |
| 2005/0104241 A1* | 5/2005 | Kritchman | B33Y 30/00 264/40.1 |
| 2015/0298467 A1* | 10/2015 | Cofler | B41J 3/4073 347/16 |

\* cited by examiner

*Primary Examiner* — Michael N Orlando
*Assistant Examiner* — Elizabeth Bradford
(74) *Attorney, Agent, or Firm* — Maginot Moore & Beck LLP

(57) ABSTRACT

A printer is configured with at least two printheads that are separated from one another in a cross-process direction by an integral multiple of printhead widths. This configuration enables parallel swaths of material to be ejected and then movement of the printheads in the cross-process direction by a distance corresponding to one or more integral numbers of the printhead width enables the area between the swaths to be completed and the area outside of the original swaths printed.

8 Claims, 5 Drawing Sheets

PRINTER HAVING SEPARATED PRINTHEAD ARRAY AND METHOD FOR OPERATING A PRINTER HAVING A SEPARATED PRINTHEAD ARRAY

TECHNICAL FIELD

The system and method disclosed in this document relate to printers that use printhead arrays and, more particularly, to printers that arrange multiple printheads in a single row of an array.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

Previously known three-dimensional object printers and many two-dimensional printers arrange multiple printheads in a column aligned with a process direction to eject material drops in swaths. These printers typically move the printhead array back and forth over a part or substrate. Small shifts in the cross-process direction are made between passes if multi-pass printing of each swath is necessary and larger shifts are made to print the next swath adjacent to the first swath, if the image or part area is wider than the width of a single swath. The speed or productivity of these devices depends on the width of each swath, which depends on the width of the printheads in the array. An example of a printer that uses swath printing is shown in FIG. 8. In the figure, an array of printheads 104 is arranged in a column aligned with the process direction P and is configured for reciprocating movement in the process direction. The printheads in the array 104 are oriented to eject drops of material onto surface 108, which can be a platen on which a part is produced in a three-dimensional object printer or a media substrate in an inkjet printer. A controller operates an actuator to move the array of printheads from position A to position B while operating the printheads to eject drops of material from the printheads. Small movements of the printheads in the cross-process direction, which is orthogonal to the process direction P, can be used to increase the resolution of the drops in the swath. Once the printing of the swath is complete, the controller operates the actuator to move the array of printheads in the cross-process direction by a distance is approximately equal to a width of the printheads in the array 104. This movement to position C enables the controller to operate the actuator and the printheads to form the second swath adjacent to the first swath.

The productivity of the system shown in FIG. 8 can be increased by increasing the width of the printed swath. Unfortunately, alignment of the ejectors in the rows of the printheads becomes more difficult as the length of the rows increases. The width of the printed swath can be increased without encountering this issue by adding printheads to the array 104. Printheads cannot be butted end-to-end, however, because a printhead housing is wider than the array of ejectors in the printhead so the printheads are typically staggered in the array 104' as shown in FIG. 9. This structure drastically increases the length of the printhead array in the process direction, which increases the time for each pass between positions A and B in the process direction since longer travel time is required. Therefore, configuring a printhead array to reduce the time required for printing an image or forming a part without increasing the length of the printhead array would be beneficial.

SUMMARY

A printer having a printhead array that enables faster printing and part formation without increasing the length of the array includes a member having a surface, at least two printheads, each printhead having an array of ejectors configured to eject drops of material toward the surface of the member, the printheads in the at least two printheads being mounted in tandem with one another and each of the printheads in the at least two printheads being separated in a cross-process direction from a closest printhead in the at least two printheads by a distance corresponding to an integral number of widths of one of the printheads, at least one actuator operatively connected to the member or the at least two printheads, and a controller operatively connected to the at least two printheads and the at least one actuator. The controller is configured to operate the at least one actuator to move the member or the at least two printheads in a process direction while operating the at least two printheads to eject drops of material from the at least two printheads and form a swath with each of the printheads in the at least two printheads with the swaths being separated by the distance corresponding to the integral number of widths of one of the printheads, and operate the at least one actuator to move the member or the at least two printheads in the cross-process direction by a distance corresponding to one or more integral number of widths of one of the printheads.

A method of operating the printer having a printhead array that enables faster printing and part formation without increasing the length of the array includes operating at least one actuator with a controller to move a member having a surface or at least two printheads in a process direction while operating the at least two printheads to eject drops of material from the at least two printheads and form a swath on the member with each of the printheads in the at least two printheads, the swaths being separated by a distance corresponding to an integral number of widths of one of the printheads, and operating the at least one actuator with the controller to move the member or the at least two printheads in the cross-process direction by a distance corresponding to one or more integral number of widths of one of the printheads.

BRIEF DESCRIPTION OF THE DRAWINGS

The foregoing aspects and other features of a printer having a printhead array that enables faster printing and part formation without increasing the length of the array and the method for operating the printer are explained in the following description, taken in connection with the accompanying drawings.

DETAILED DESCRIPTION

Figure 1:
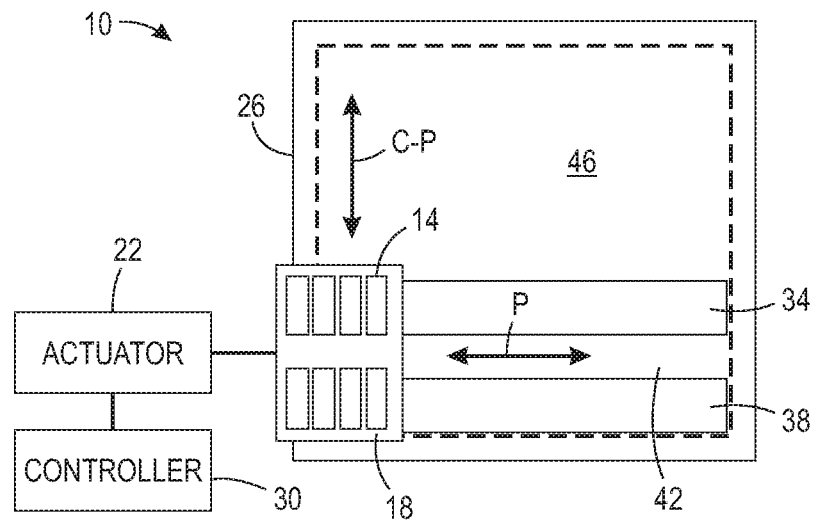
FIG. 1 is an illustration of a printhead array having two columns of printheads that are separated from one another by one width of the printheads.

For a general understanding of the environment for the system and method disclosed herein as well as the details for the system and method, reference is made to the drawings. In the drawings, like reference numerals designate like elements. As used in this document, the term "three-dimensional object printer" refers to any device that ejects material with reference to image data of an object to form a three-dimensional object.

FIG. 1 shows a printer 10 that is configured with two arrays of printheads that are separated from one another by a distance that is equal to a width of a single printhead in one of the arrays. The printer 10 includes an array of printheads 14 and an array of printheads 18 that are operatively connected to an actuator 22 to enable the actuator to move the arrays of printheads in tandem. As used in this document, "tandem" refers to printheads being mounted with reference to one another so they move together in the process and cross-process direction. Alternatively, the actuator 22 can be operatively connected to the substrate or platen 26 to move the platen with reference to the two arrays of printheads. A controller 30 is configured with programmed instructions stored in a memory operatively connected to the controller 30 to enable the controller 30 to operate the actuator 22 to move either the arrays 14 and 18 in tandem or to move the platen 26. The controller 30 is configured, for example, to move the printheads in a process direction P in a reciprocating manner and a cross-process direction CP with reference to the surface of the platen 26. Alternatively, actuator 22, which can be implemented with one or more actuators, can be operatively connected to the platen 26 to move the platen in the process and cross-process directions in the plane of the platen 26. As used herein, the term "process direction" refers to an axis in the surface of the platen that is aligned or parallel with the longitudinal axes of the printhead arrays and "cross-process direction" refers to an axis in the platen surface that is orthogonal to the process direction in that surface. These directions are denoted with the letters "P" and "C-P" in the figures. In a three-dimensional object printer, the printhead arrays 14 and 18 or the platen 26 can also be configured to move in a direction that is orthogonal to the platen 26. This direction is called the vertical direction in this document and it enables the printheads in the arrays and the top layer of a part being formed on the platen 26 to remain at a constant distance from one another as layers are added to the part. The actuators configured for vertical movement of the platen or the arrays are also operatively connected to the controller 30, which operates the actuators to control the vertical movement of the platen 26 or the printhead arrays 14 and 18.

As shown in FIG. 1, the controller 30 operates the actuator 22 in the embodiment of that figure to move the arrays in a reciprocating manner along the process direction P and operates the ejectors in the printheads of the two arrays 14 and 18 to print two swaths of material 34 and 38. Additionally, the controller 30 can operate the actuator 22 to move the printheads in the two arrays in the cross-process direction by one or more pixel widths to increase the resolution of the drops within the swath. Once the printing of the swaths 34 and 38 is completed, the controller 30 operates the actuator 22 to move the arrays 14 and 18 in the cross-process direction by one printhead width to enable array 18 to print the unprinted area 42 and array 14 to print a swath adjacent to swath 34 on the side opposite the unprinted area 42. The printing of swaths at the appropriate resolution and the moving of the arrays in the cross-process direction continues until the printed swaths cover the entirety of or a portion of the printing area 46 to form a part in a three-dimensional object printer or an image in a two-dimensional image printer.

Figure 2:
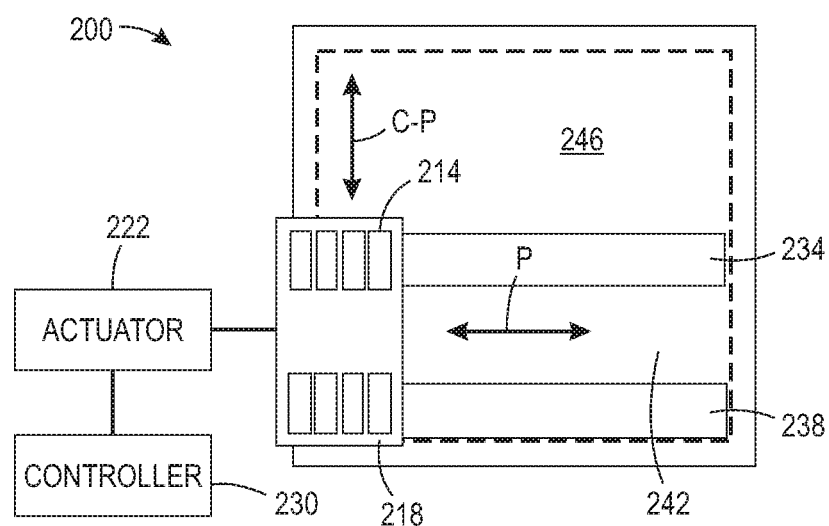
FIG. 2 is an illustration of a printhead array having two columns of printheads that are separated from one another by two widths of the printheads.

FIG. 2 shows a printer 200 that is configured with two arrays of printheads that are separated from one another by a distance that is approximately equal to two widths of a single printhead in one of the arrays. The printer 200 includes an array of printheads 214 and an array of printheads 218 that are operatively connected to an actuator 222 to enable the actuator to move the arrays of printheads in tandem. Alternatively, the actuator 222 can be operatively connected to the substrate or platen 226 to move the platen with reference to the two arrays of printheads. A controller 230 is configured with programmed instructions stored in a memory operatively connected to the controller 230 to enable the controller 230 to operate the actuator 222 to move either the arrays 214 and 218 in tandem or to move the platen 226. The controller 230 is configured, for example, to move the printheads in a process direction P in a reciprocating manner and a cross-process direction CP with reference to the surface of the platen 226. Alternatively, actuator 222, which can be implemented with one or more actuators, can be operatively connected to the platen 226 to move the platen in the process and cross-process directions in the plane of the platen 226. As used herein, the term "process direction" refers to an axis in the surface of the platen that is aligned or parallel with the longitudinal axes of the printhead arrays and "cross-process direction" refers to an axis in the platen surface that is orthogonal to the process direction in that surface. These directions are denoted with the letters "P" and "C-P" in the figures. In a three-dimensional object printer, the printhead arrays 214 and 218 or the platen 226 can also be configured to move in a direction that is orthogonal to the platen 226. This direction is called the vertical direction in this document and it enables the printheads in the arrays and the top layer of a part being formed on the platen 226 to remain at a constant distance from one another as layers are added to the part. The actuators configured for vertical movement of the platen or the arrays are also operatively connected to the controller 230, which operates the actuators to control the vertical movement of the platen 226 or the printhead arrays 214 and 218.

As shown in FIG. 2, the controller 230 operates the actuator 222 in the embodiment of that figure to move the arrays in a reciprocating manner along the process direction P and operates the ejectors in the printheads of the two arrays 214 and 218 to print two swaths of material 234 and 238. Additionally, the controller 230 can operate the actuator 222 to move the printheads in the two arrays in the cross-process direction by one or more pixel widths to increase the resolution of the drops within the swath. Once the printing of the swaths 234 and 238 is completed, the controller 230 operates the actuator 222 to move the arrays 214 and 218 in the cross-process direction by one printhead width to enable array 218 to print one-half of the unprinted area 242 and array 214 to print an optional swath, if required, adjacent to swath 234 on the side opposite the unprinted area 242. Once the printing of those swaths is completed, the controller 230 operates the actuator 222 to move the arrays 214 and 218 in the cross-process direction by approximately one printhead width to enable array 218 to print the remaining half of the unprinted area 242 adjacent swath 234 and array 214 to print an optional swath, if required, adjacent the swath the array 214 printed adjacent to the swath 234. The controller 230 then operates the actuator 222 to move the array 214 to print a swath adjacent to the last swath printed by the array 218 if any unprinted portion of the area 246 remains for printing. This movement occurs, for example, when the object being built is wider than six swaths. The printing of swaths at the appropriate resolution and the moving of the arrays in the cross-process direction continues until the printed swaths cover the entirety of or a portion of the printing area 246 to form a part in a three-dimensional object printer or an image in a two-dimensional image printer.

As can be understood from the discussion of the embodiments shown in FIG. 1 and FIG. 2, the reader can appreciate that reduced time for part or image production can be achieved with a printer having at least two printhead arrays that are separated by a distance corresponding to an integral number of printhead widths without any intervening printheads. As used in this document, "integral number of printhead widths" means approximately an integral number of printhead widths. For example, the movement of a printhead by one or more integral printhead widths can mean about 95% to about 1.05% of the distance that is the distance equal to the integral number of printhead widths times the exact width of a printhead. This slight deviation accommodates margins on the outer ends of a printhead faceplate. With this configuration, swaths can be printed with an intervening clear area and movements of the printhead arrays in tandem by a distance corresponding to one or more integral multiples of the printhead width enable the clear area to be completed and an area outside the original swaths to be extended.

Figure 3:
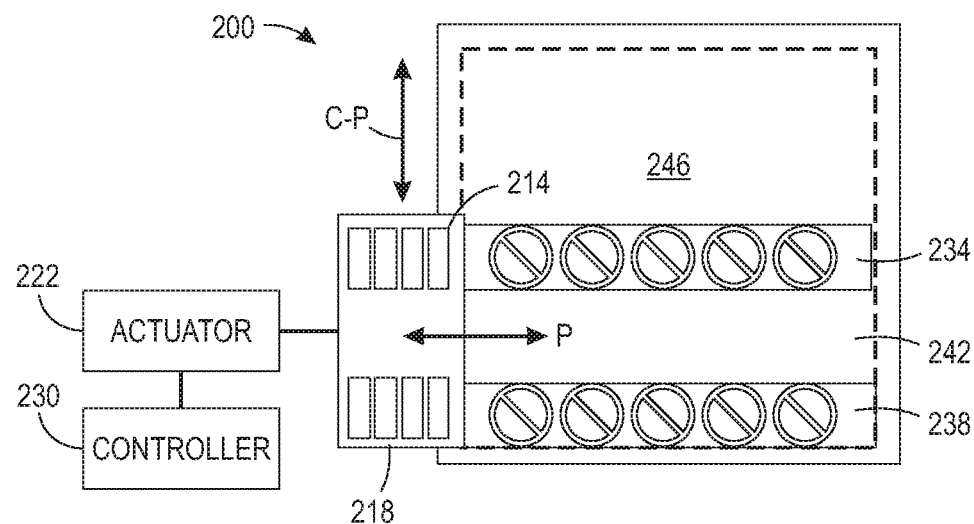
FIG. 3 illustrates the operation of the printhead array of FIG. 2 to produce components having a width of one swath in a three-dimensional object printer.
Figure 4:
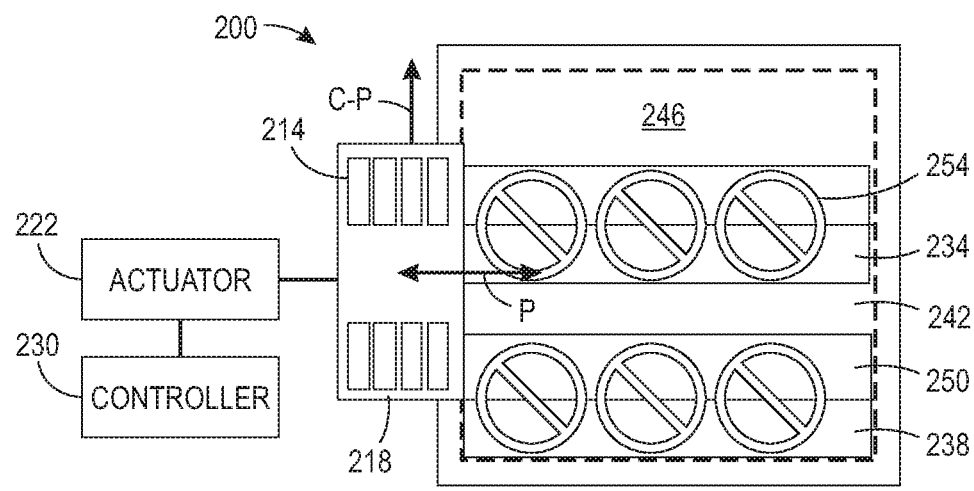
FIG. 4 illustrates the operation of the printhead array of FIG. 2 to produce components having a width of two swaths in a three-dimensional object printer.

FIG. 3 and FIG. 4 depict the versatility of printer 200 to form parts having different sizes. In FIG. 3, the controller 230 operates the printhead array 218 to form parts within the swath 238 while also operating the printhead array 214 to form parts within the swath 234. The controller 230 can operate the actuator 222 to move the printhead arrays 214 and 218 by one width of the printheads so the array 218 prints another row of parts in the swath adjacent to swath 238 and the array 214 prints another row of parts in the swath adjacent to swath 234 on the side of swath 234 that is opposite area 242. In FIG. 4, the controller 230 operates the printhead array 218 to form a portion of a plurality of parts within the swath 238 while also operating the printhead array 214 to form a portion of another plurality of parts within the swath 234. The controller 230 can operate the actuator 222 to move the printhead arrays 214 and 218 by one width of the printheads so the array 218 finishes the parts in swath 250 adjacent to swath 238 and the array 214 finishes the parts in the swath 254 adjacent to swath 234.

Figure 5:
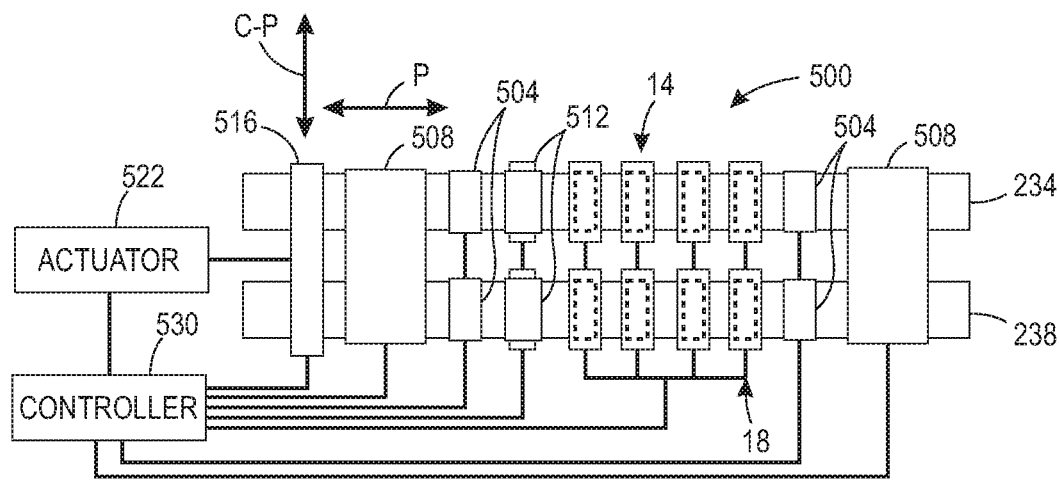
FIG. 5 depicts a configuration of a three-dimensional object printer having a leveling roller for each printhead array.
Figure 6:
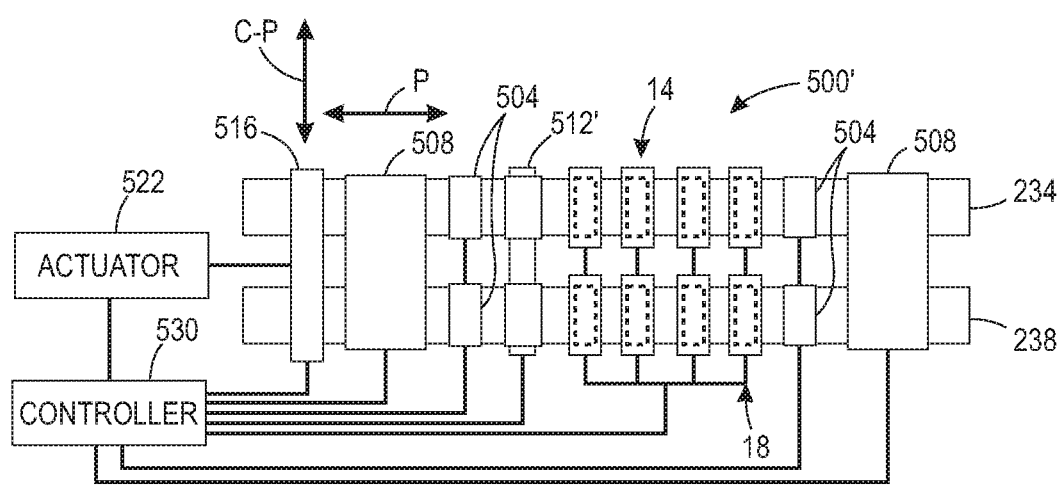
FIG. 6 depicts a configuration of a three-dimensional object printer having a single leveling roller for both printhead arrays.

FIG. 5 depicts an embodiment of a three-dimensional printer that incorporates printhead arrays 14 and 18 as described above with regard to FIG. 1. That is, these printhead arrays are separated by a width that is approximately equal to a width of a single printhead in one of the arrays. The controller 530 is operatively connected to one or more actuators 522, an optical sensor 516, coolers 508, ultraviolet (UV) curing devices 504, leveling rollers 512, and the printheads in the printhead arrays 14 and 18. The controller 530 is configured with programmed instructions stored in a memory operatively connected to the controller. The controller 530 operates the actuator(s) 522 move the above-identified components of the printer 500 to form parts on a surface. The controller operates the actuator(s) to move the components in a reciprocating manner over the surface to eject material onto the surface, level the ejected material, cure photopolymer material, cool ejected material, and enable the sensor to generate image data of ejected material on the surface so the controller can analyze the image data to evaluate the quality of the part printing operation. The UV curing devices 504 are known devices that emit radiation at an appropriate wavelength for curing ejected photopolymer material. The coolers 508 can be fans or the like that generate an air flow that can be directed towards the ejected material to dissipate thermal energy from the ejected material. The sensor 516 can be an optical sensor having an array of photodetectors and a light source or it can be a thermal imaging device, such as an infrared camera. The sensor generates image data of the ejected material on the surface that the controller 530 analyzes to detect inoperative ejectors in the printheads or to detect irregularities in the parts being printed so remedial action can be taken. The leveling rollers 512 are rotating rollers having surfaces that remove uncured ejected material from a part. The controller 530 operates the actuator(s) 522 to move the components of the printer 500 in tandem about the surface in the process and cross-process directions. Additionally, the controller 530 operates actuator(s) 522 to move the leveling rollers 512 vertically with respect to the surface to remove a predetermined amount of material from parts or portions of parts printed in the swaths 234 and 238. The embodiment of the printer 500' shown in FIG. 6 is the same as the printer 500 except the leveling rollers 512 are replaced by a leveling roller 512'. The leveling roller 512' is a single rotating cylinder that has two larger diameter sections and each of these sections has a width that corresponds to a width of a single printhead. Because the leveling roller 512' does not have a constant diameter across its width, the roller does not contact swaths previously printed by the printer 500'.

Figure 7:
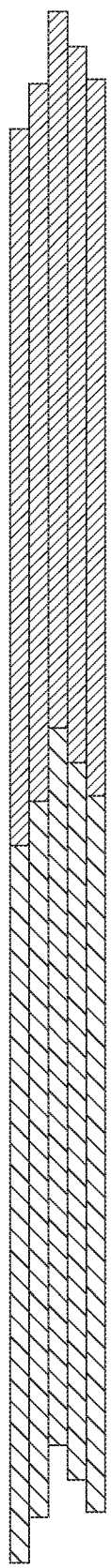
FIG. 7 illustrates an interleaving of layers formed by swath printing.
Figure 8:
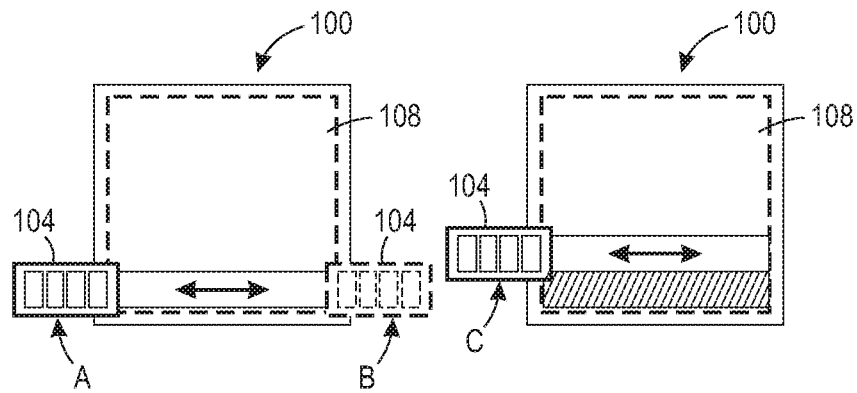
FIG. 8 depicts a prior art configuration for swath printing with a single array of printheads.
Figure 9:
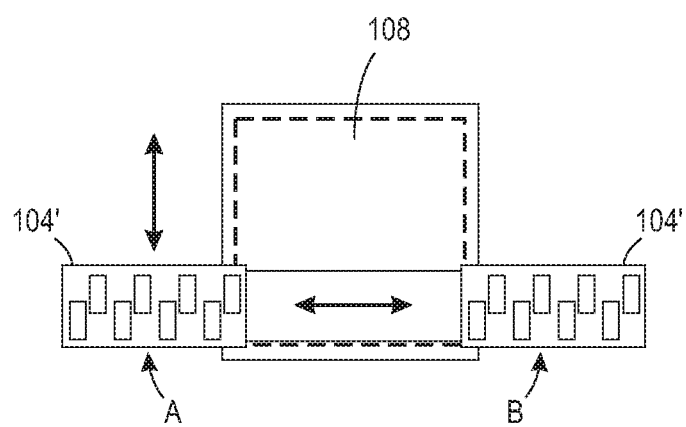
FIG. 9 depicts a prior art configuration for swath printing with a single array of staggered printheads to increase the width of the printhead array.

FIG. 7 shows how the printers having the arrays separated by an integral number of printhead widths can be controlled to vary the interface between layers. By operating the actuator to move the printhead arrays in a reciprocating manner in the cross-process direction by a distance with some predetermined range, the abutting interface between swaths can be shifted to help adjoin the layers to one another and mask the interface between the swaths. To achieve this benefit, the predetermined range is a number of ejectors, such as the number of ejectors corresponding to approximately 100 pixels of print width, which can be lost from the beginning of the first swath and the end of the last swath. This loss, however, does not affect the swaths between the first and the last swaths.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A printer comprising:
   a member having a surface;
   at least two printheads, each printhead having an array of ejectors configured to eject drops of material toward the surface of the member, the printheads in the at least two printheads being mounted in tandem with one another and each of the printheads in the at least two printheads being separated in a cross-process direction from a closest printhead in the at least two printheads by a distance corresponding to an integral number of widths of one of the printheads;
   at least one actuator operatively connected to the member or the at least two printheads;
   a roller having at least two portions with a diameter that is greater than one or more portions of the roller separating the portions having the greater diameter, the portions having the greater diameter being separated by the distance corresponding to the integral number of widths of one of the printheads; and
   a controller operatively connected to the at least two printheads and the at least one actuator, the controller being configured to:
      operate the at least one actuator to move the member or the at least two printheads in a process direction while operating the at least two printheads to eject drops of material from the at least two printheads and form a swath with each of the printheads in the at least two printheads with the swaths being separated by the distance corresponding to the integral number of widths of one of the printheads;
      operate the at least one actuator to move the member or the at least two printheads in the cross-process direction by a distance corresponding to one or more integral number of widths of one of the printheads; and
      operate the at least one actuator to move the member or the roller in the process direction at a predetermined distance from the drops of material ejected from the at least two printheads while operating the at least one actuator to rotate the roller to remove a portion of the drops of material ejected from the at least two printheads.

2. The printer of claim 1 wherein the printheads in the at least two printheads are separated by a distance corresponding to a width of a single printhead.

3. The printer of claim 1 wherein the printheads in the at least two printheads are separated by a distance corresponding to a width of two printheads.

4. The printer of claim 1, the controller is further configured to:
   operate the at least one actuator to move the at least two printheads in the process direction after the member or the at least two printheads have been moved in the cross-process direction while operating the at least two printheads to eject drops of material from the at least two printheads and form another swath with each of the printheads in the at least two printheads with the swaths being separated by the distance corresponding to the integral number of widths of one of the printheads.

5. The printer of claim 1 further comprising:
   at least two curing devices separated by the distance corresponding to the integral number of widths of one of the printheads; and
   the controller operatively connected to the at least two curing devices, the controller being configured to:
      operate the at least one actuator to move the member or the at least two curing devices in the process direction while operating the at least two curing devices to expose the drops of material ejected from the at least two printheads.

6. The printer of claim 1 the roller further comprising:
   at least two rollers separated by the distance corresponding to the integral number of widths of one of the printheads to form the two portions of the roller; and
   the controller being further configured to:
      operate the at least one actuator to move the member or the at least two rollers in the process direction at a predetermined distance from the drops of material ejected from the at least two printheads while operating the at least one actuator to rotate the at least two rollers to remove a portion of the drops of material ejected from the at least two printheads.

7. The printer of claim 1, the controller being further configured to:
   operate the at least one actuator to move the member or the at least two printheads in the cross-process direction to enable the at least two printheads to eject drops of material within a swath previously formed by the at least two printheads.

8. The printer of claim 1, the controller being further configured to:
   operate the at least one actuator to move the member or the at least two printheads in the cross-process direction by a distance that enables the at least two printheads to form a swath over swaths previously formed by the at least two printheads with edges of the swaths being formed not being aligned with edges of the swaths previously formed by the at least two printheads.

* * * * *